Jan. 16, 1923.                                            1,442,118.
R. H. BOWERS.
CLAMPING SCREW.
FILED SEPT. 3, 1921.

Inventor
Roscoe H. Bowers
By Frease and Bond
Attorneys

Patented Jan. 16, 1923.

1,442,118

UNITED STATES PATENT OFFICE.

ROSCOE H. BOWERS, OF EAST CANTON, OHIO, ASSIGNOR OF ONE-HALF TO RALPH E. HAY, OF CANTON, OHIO.

CLAMPING SCREW.

Application filed September 3, 1921. Serial No. 498,577.

*To all whom it may concern:*

Be it known that I, ROSCOE H. BOWERS, a citizen of the United States, residing at East Canton, in the county of Stark and State of Ohio, have invented a new and useful Clamping Screw, of which the following is a specification.

This invention relates to improvements in screw operating devices such as may be used in numerous forms such as glass holders for automobile doors, or any other device where a clamping action is required, means being provided for preventing rotation of the screw while it is moved longitudinally by means of a rotatable nut.

The above and other objects may be attained by providing a pair of parallel bearing members having aligned apertures therein, V-shaped projections extending into said apertures, the screw being provided with V-shaped grooves which receive said projections, a nut being mounted upon the screw between the bearing members.

With these objects in view, the invention consists in the construction and arrangement of parts, hereinafter described and illustrated in the accompanying drawings, it being understood that various changes in the form and details of construction may be made within the scope of the appended claims.

In the accompanying drawing, the invention is illustrated as embodied in an automobile door glass holder, in which—

Figure 1:
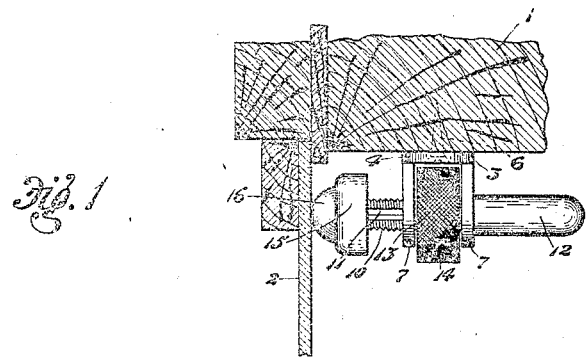
Figure 2:
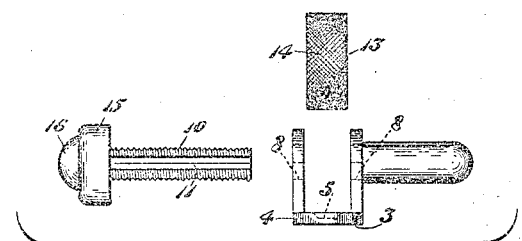
Figure 3:
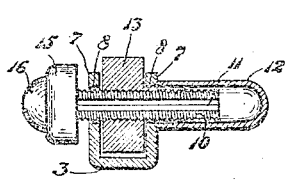
Figure 4:
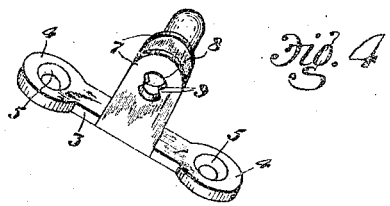
Figure 5:
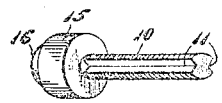
Figure 6:
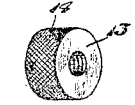

Figure 1 is an elevation of the device applied to the glass of an automobile door;

Fig. 2, an elevation of the several parts of the device separated;

Fig. 3, a longitudinal section through the device;

Fig. 4, a perspective view of the bracket;

Fig. 5, a detached perspective of the screw;

Fig. 6, a detached perspective of the nut; and

Figure 7:
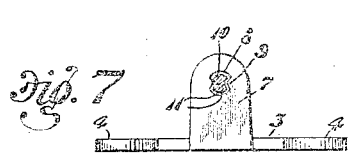

Fig. 7, a transverse section of the device.

Similar numerals of reference indicate corresponding parts throughout the several figures of the drawing.

A portion of the frame of an automobile body is shown at 1 and a portion of the door glass at 2. The bracket 3 of the device is provided with the oppositely disposed attaching lugs 4 having counter-sunk apertures 5 for the reception of screws or the like, as shown at 6.

A pair of spaced ears 7 are formed upon the bracket 3 and constitute the bearing members, each ear having an aperture 8 provided with the inwardly disposed V-shaped projections 9 upon diametrically opposite sides thereof, the apertures in the two ears being aligned in order to slidably receive the screw 10 which is provided upon diametrically opposite sides with the V-shaped groove 11 into which the projections 9 extend.

A tubular casing 12 is mounted upon one of the ears 7 in position to receive the screw, the end thereof being closed to protect the screw. If desired, grease may be placed in this case to properly lubricate the screw.

The nut 13 which is preferably cylindrical as shown in the drawings, and provided with the knurled periphery 14, is mounted upon the screw between the ears 7. In the form of the invention illustrated, a head 15 is provided upon the outer end of the screw and carries the rubber button 16 arranged to engage the surface of the door glass to hold the same from rattling.

By rotating the nut in either direction, the screw will be moved longitudinally through the apertures 8 of the ears, the projections 9 in said apertures engaging the grooves 11 in the screw, preventing the same from rotating, but allowing the screw to be easily operated.

While the screw has been illustrated as applied to an automobile door glass holder, it will be evident, of course, that the same device may be used for numerous other purposes, without departing from the invention.

Although the drawings and above specification disclose the best mode in which I have contemplated embodying my invention, I desire not to be limited to the details of such disclosure, for, in the further practical application of my invention, many changes in form and construction may be made, as circumstances require or experience suggests, without departing from the spirit of the invention, within the scope of the appended claims.

I claim:—

1. A device of the character described comprising spaced bearing members having aligned openings therein, projections in said openings, a screw slidably mounted through the openings and longitudinally grooved to receive the projections, a nut mounted upon the screw between the bearing members and a tubular casing fixed upon one of the bearing members and arranged to normally house the screw.

2. A device of the character described comprising a bracket, spaced ears thereon provided with aligned openings, a pair of V-shaped projections in each opening, a screw slidably mounted through the openings and provided with longitudinal V-shaped grooves receiving said projections, a tubular casing upon one ear arranged to normally house the screw, a nut upon the screw between the ears and a button upon the outer end of the screw.

3. A device of the character described comprising a bracket, spaced ears thereon provided with aligned openings, a pair of V-shaped projections in each opening, a screw slidably mounted through the openings and provided with longitudinal V-shaped grooves receiving the projections, a tubular casing fixed upon one ear and arranged to normally house the screw and a nut upon the screw between the ears.

In testimony that I claim the above, I have hereunto subscribed by name.

ROSCOE H. BOWERS.